(12) United States Patent
Yeung et al.

(10) Patent No.: US 7,676,668 B2
(45) Date of Patent: *Mar. 9, 2010

(54) SYSTEM AND METHOD FOR MONITORING CONFIGURATION CHANGES IN A DOCUMENT PROCESSING DEVICE

(75) Inventors: Michael Yeung, Mission Viejo, CA (US); Amir Shahindoust, Laguna Niguel, CA (US); Girish R. Krishna, Torrance, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 162 days.

This patent is subject to a terminal disclaimer.

(21) Appl. No.: 11/778,775

(22) Filed: Jul. 17, 2007

(65) Prior Publication Data

US 2008/0016331 A1    Jan. 17, 2008

Related U.S. Application Data

(63) Continuation of application No. 10/806,959, filed on Mar. 23, 2004, now Pat. No. 7,246,223.

(51) Int. Cl.
*G06F 15/177* (2006.01)
(52) U.S. Cl. .................................. 713/1; 713/2; 713/100
(58) Field of Classification Search ........................ 713/1
See application file for complete search history.

(56) References Cited

U.S. PATENT DOCUMENTS

| 6,185,682 | B1 * | 2/2001 | Tang ........................... 713/168 |
|---|---|---|---|
| 6,470,454 | B1 * | 10/2002 | Challener et al. ............. 726/17 |
| 6,526,442 | B1 | 2/2003 | Stupek, Jr. et al. |
| 6,895,414 | B2 * | 5/2005 | Ford et al. ................... 707/203 |
| 7,024,548 | B1 * | 4/2006 | O'Toole, Jr. .................... 713/1 |
| 2002/0069272 | A1 * | 6/2002 | Kim et al. .................... 709/221 |
| 2002/0129141 | A1 | 9/2002 | Sogabe et al. |
| 2002/0178243 | A1 | 11/2002 | Collins |
| 2003/0005109 | A1 | 1/2003 | Kambhammettu et al. |
| 2003/0221004 | A1 | 11/2003 | Stupek, Jr. et al. |
| 2004/0024736 | A1 | 2/2004 | Sakamoto et al. |
| 2004/0025092 | A1 | 2/2004 | Babutzka et al. |
| 2004/0196492 | A1 * | 10/2004 | Johnson et al. ............ 358/1.15 |

* cited by examiner

*Primary Examiner*—Nitin C Patel
(74) *Attorney, Agent, or Firm*—Trucker Ellis & West LLP

(57) ABSTRACT

The subject application is directed to a method and system for notifying an administrator when a user of a document processing device requests a change in the configuration of the device. A user accesses the device via a user interface, requesting alteration of the device configuration. The user then provides identification information and an authentication server determines whether the identified user is authorized to make the configuration change. Access is denied to unverified or unauthorized users attempting to change the configuration of the device. When the user is verified, but not authorized to make the requested change, the authentication server rejects the request and notifies the administrator of the attempt. When the user is both verified and authorized to make a change, the device configuration is altered, conforming to the requested configuration, and a notice is transmitted to the administrator containing information about the change in configuration.

18 Claims, 3 Drawing Sheets

SYSTEM AND METHOD FOR MONITORING CONFIGURATION CHANGES IN A DOCUMENT PROCESSING DEVICE

CROSS-REFERENCE TO RELATED APPLICATIONS

This Application is a Continuation of U.S. patent application Ser. No. 10/806,959, filed Mar. 23, 2004 now U.S. Pat. No. 7,246,223, the entirety of which is incorporated herein.

BACKGROUND OF THE INVENTION

This invention is directed to a system and method for monitoring configuration changes in a document processing device. More particularly, this invention is directed to a system and method that generates a notification to an administrator or supervisor when a user of a document processing device, such as a multifunctional peripheral device, requests a change in the configuration of the document processing device.

The management and control of a document processing device, such as a multifunctional peripheral device, is a major task. Typically setting usage policies, access control to the document processing device, and device configuration is performed via an administrator, supervisor, or other authorized user having access to such features. However, often these functions are performed on document processing devices which do not have acceptable verification or authentication procedures ensuring that only authorized users perform such functions in place to prevent unauthorized users from performing such functions. Certain functions nonetheless must be available for modification by end users of office peripherals. However, if certain changes are made, they may ultimately lead to problems if left in a modified state, or lead to problems if combined with other machine modifications.

The subject invention remedies the afore-noted problems, and provides a mechanism by which modifications to office peripherals may be monitored by a system administrator who may then take any steps deemed advisable to make sure equipment is ready for subsequent use.

SUMMARY OF THE INVENTION

In accordance with the invention, there is provided a mechanism by which modifications to office peripherals may be monitored by a system administrator who may then take any steps deemed advisable to make sure equipment is ready for subsequent use.

Further, in accordance with the present invention, there is provided a system and method for monitoring configuration changes to a document processing device.

Still further, in accordance with the present invention, there is provided a system and method which assists in the maintenance and monitoring of a document processing device.

Still further, in accordance with the present invention, there is provided a system for monitoring configuration changes in a document processing device. The system comprises means adapted for receiving a configuration change signal representative of a requested configuration change for an associated document processing device and means adapted for generating notification signal representative of the requested configuration change for the associated document processing device. The system also comprises identifier data storage means adapted for storing identifier data representative of contact information for at least one supervisor and means adapted for directing data representative of the notification signal to the at least one supervisor after receipt of a configuration change signal.

In a preferred embodiment, the system further comprises means adapted for receiving user data representative of an identity of a user requesting a configure change and means adapted for communicating the user data to the at least one supervisor after receipt of a configuration change signal. Preferably, the system also comprises authentication means adapted for verifying the identity of the user requesting a change configuration and that the user is authorized to request the configuration change. Preferably, the notification signal is sent via SMTP or TCP.

Still further, in accordance with the present invention, there is provided a method for monitoring configuration changes in a document processing device. The method comprises the steps of receiving a configuration change signal representative of a requested configuration change for an associated document processing device and generating notification signal representative of the requested configuration change for the associated document processing device. The method also comprises the steps of storing identifier data representative of contact information for at least one supervisor and directing data representative of the notification signal to the at least one supervisor after receipt of a configuration change signal.

In a preferred embodiment, the method further comprises the steps of receiving user data representative of an identity of a user requesting a configure change and communicating the user data to the at least one supervisor after receipt of a configuration change signal. Preferably, the method also comprises the step of verifying the identity of the user requesting a change configuration and that the user is authorized to request the configuration change. Preferably, the notification signal is sent via SMTP or TCP.

These and other aspects, advantages, and features of the present invention will be understood by one of ordinary skill in the art upon reading and understanding the specification.

DETAILED DESCRIPTION OF THE PREFERRED EMBODIMENTS

This invention is directed to a system and method for monitoring configuration changes to a document processing device. The system and method that generates a notification to an administrator or supervisor when a user of a document processing device, such as a multifunctional peripheral device, requests a change in the configuration of the document processing device.

Figure 1:
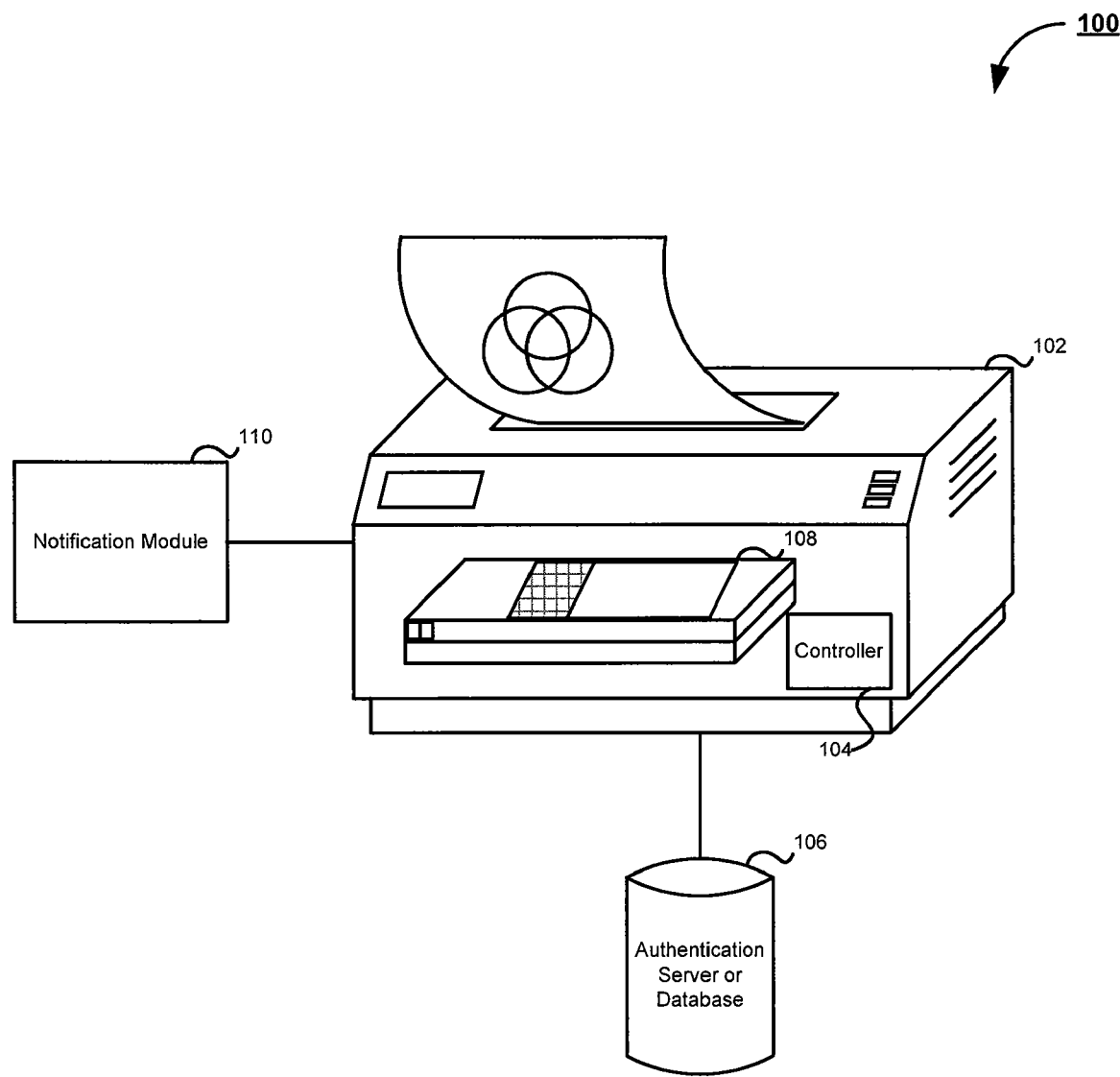
FIG. 1 is a block diagram of the system according to the present invention.

FIG. 1 shows a block diagram preferred embodiment of the system according to the present invention generally designated as 100. The system comprises at least one document processing device, as illustrated by multi-function peripheral device 102, for generating or processing image data. It is to be appreciated that document processing device is any suitable document processing device known in the art, such as a copier, printer, scanner and the like, or any combination thereof. Suitable commercially available document reading devices include, but are not limited to, the Toshiba e-Studio Series Controller. The document processing device further comprises a controller 104 which controls the functions of the document processing device as will be appreciated by one of ordinary skill in the art.

The document processing device is in data communication with an associated authentication server or database 106 which functions for verifying an identity of an associated user who requests a configuration change. In one embodiment, the authentication server or database is located remotely from the document processing device and is connected to the document processing device via any suitable data communications link. In another embodiment, the authentication server or database is located within the controller of the document processing device and interacts with document processing device to verify user identity via any suitable means.

The document processing device is also in data communication with an associated user interface 108 by which the user requests the configuration change. In one embodiment, the user interface is a display means or monitor attached to or associated with the document processing device wherein the user accesses such interface to request the configuration change. In another embodiment, the user requests the configuration change remotely via a remote user interface, such as via a web administrator, connected to the document processing device via any suitable means. It will be appreciated that viable user interfaces may take various forms, such as touch screen, keypads, pen input, and the like.

The system also comprises a notification module 110 which is in data communication with the document processing device via any suitable means. The notification module monitors the requests for configuration changes via any suitable means. The notification module also generates notification messages and transmits the notification messages to the administrator upon receiving an acceptable or authenticated configuration change request.

Figure 2:
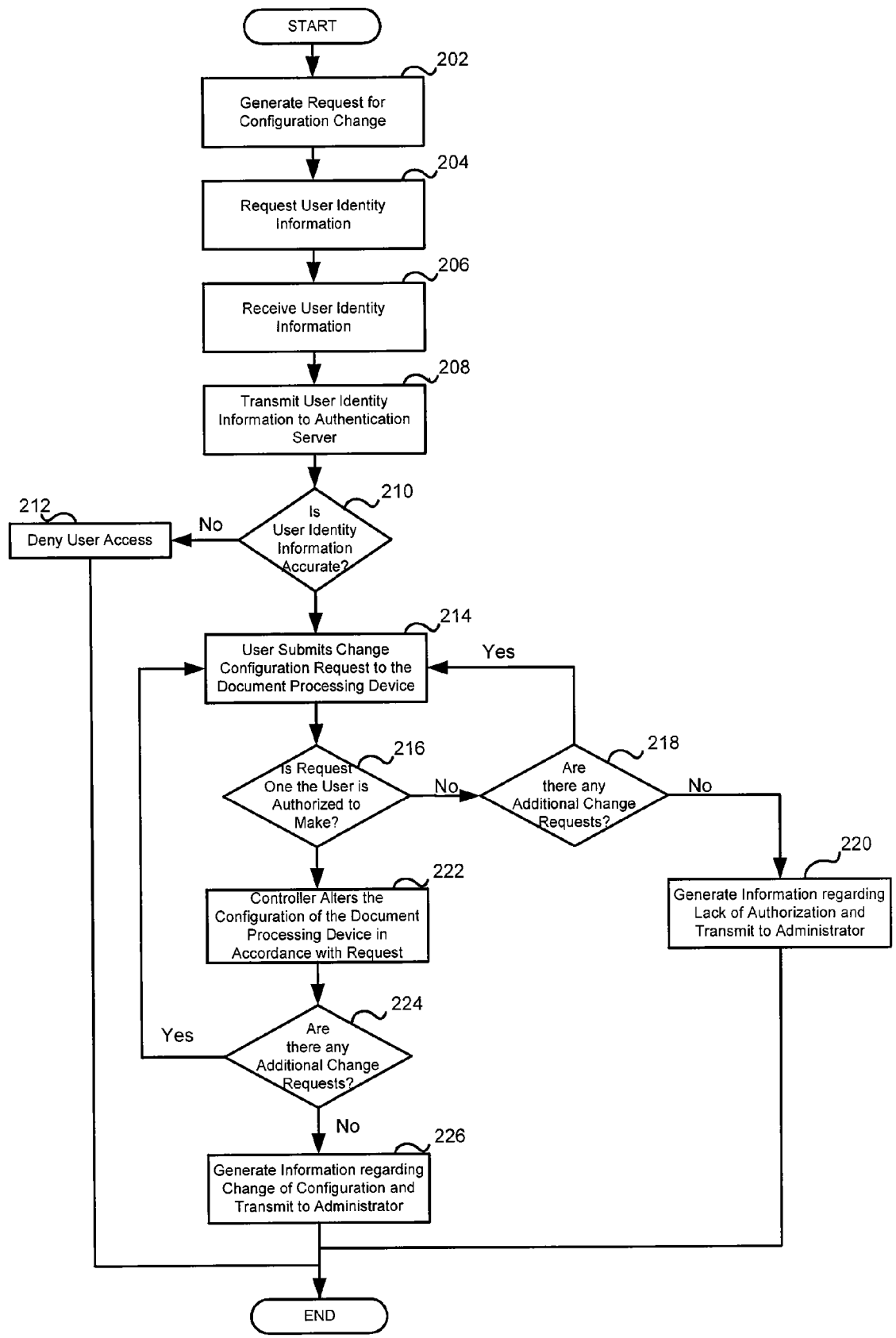
FIG. 2 is a flow chart illustrating the method according to the present invention.

FIG. 2 is illustrates a flowchart for monitoring configuration changes according to the present invention. At 202, an associated user of the document processing device accesses the user interface to generate a request for a configuration change via any suitable means. At 204, the user is prompted for user identity information via any suitable means. The user provides the requested user identity information, such as user name and password, via any suitable means at 206.

At 208, the user identity information is transmitted to the authentication server or database via any suitable means. The authentication server or database analyzes the user identity verification via any suitable means to determine if the user identity information is accurate and if the user is authorized to make the requested configuration change. Preferably, the authentication server or databases uses LDAP, PDC, or Kerberos to analyze the user identity information. Any of these authentication mechanisms suitably analyze the user's input, such as username and password, and compare it to the set of user's credentials in the database. If there is a match, the user is then considered trusted and authenticated.

At 210, if the user identity information is not accurate, the user is denied access at 212 and the process ends. In one embodiment, the user is notified of that access is denied. In one embodiment, the user is allowed to reenter user identity information in order to gain access.

At 210, if the user identity information is accurate, the user changes the configuration of the document processing device in accordance with such request at 214 via any suitable means.

At 216, the authentication server or database analyzes the requested configuration change to determine if the requested change is one in which the user is authorized to alter via any suitable means. At 218, if the user is not authorized to request such a configuration change, it is then determined if there are additional configuration change requests via any suitable means. If there are no more configuration change requests, the notification module generates information about the configuration change request and that the user was not authorized to make the configuration change and transmits the message to the administrator via any suitable means as shown at 220. If there are additional configuration change requests, the process returns to 214.

If the user is authorized to request the configuration change, the controller of the document processing device alters the configuration as shown at 222. It is then determined if there are any more configuration change requests at 224. If there are additional configuration change requests, the process returns to 214. If there are no more configuration change requests, the notification modules generates a message containing information about the configuration change request and transmits the message to the administrator at 226 via any suitable means.

Figure 3:
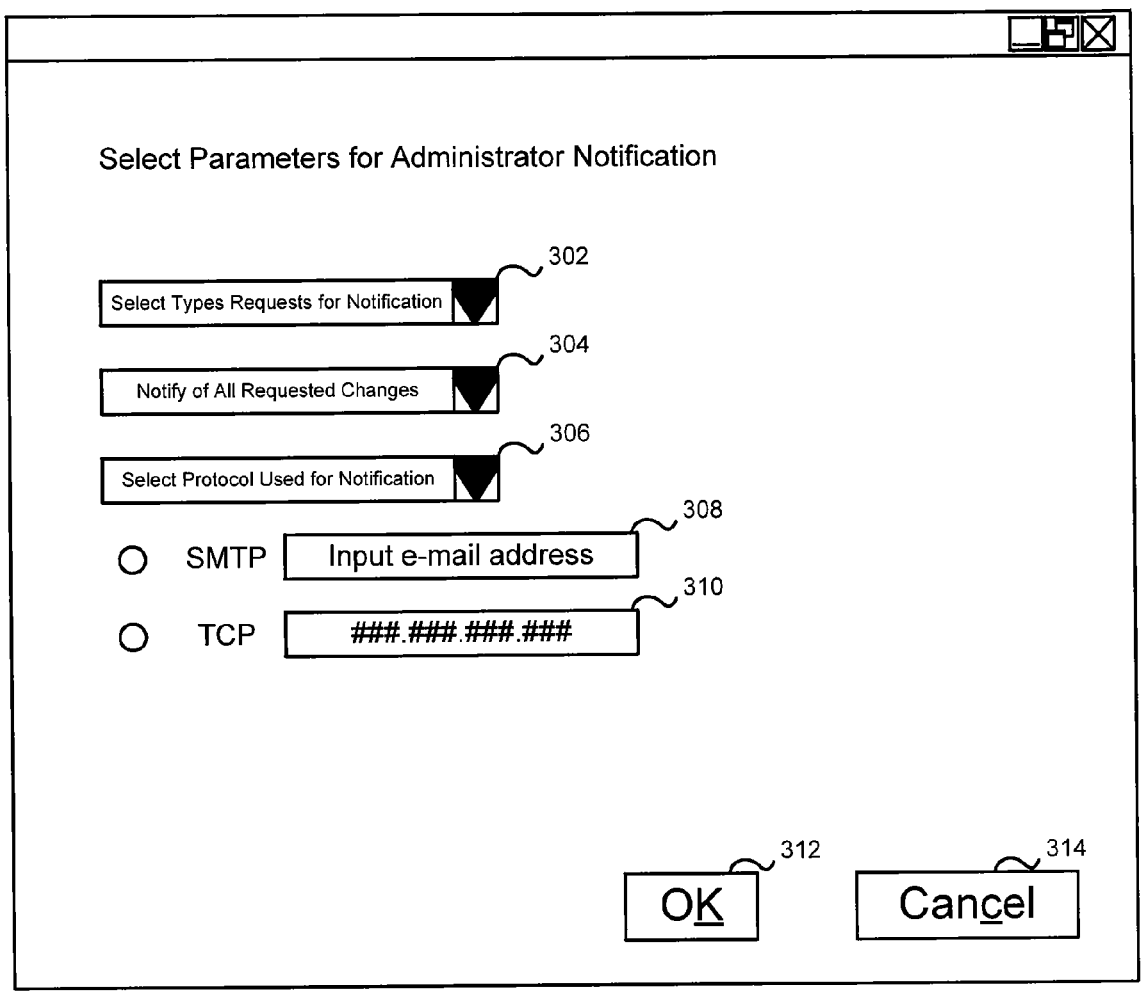
FIG. 3 is a sample template for selecting the parameters for the notification messages.

Preferably, the parameters for generating and transmitting the notification messages are selected by the administrator or other authorized user. FIG. 3 shows a sample template 300 for selecting the parameters for generating and transmitting the notification messages. The administrator provides the types of request for configuration changes in which the administrator desires to receive notification as shown at 302. The administrator also has the option to receive notification messages for all requested configuration changes as shown at 304. When the notification module receives an acceptable or authenticated configuration change request, the notification module analyzes the request via any suitable means to determine if it is of the type of which a notification message is to be generated and transmitted.

At 306, the administrator provides the protocol under which the message is to be sent. Preferably, the administrators specifies SMTP or TCP. If the administrator selects SMTP, the administrator must then provide the electronic mail address to which the message is to be sent as shown at 308. If the administrator selects TCP, the administrator must specify the IP address to which the message is to be sent as shown at 310. The administrator selects Ok 312 to select the parameters and Cancel 314 to cancel the settings.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for monitoring configuration changes in a document processing device comprising:

means for receiving notification setup data representative of configuration changes for which notification is desired from an associated supervisor;

means for receiving a configuration change signal representative of a requested configuration change for an associated document processing device;

comparing means for comparing the received configuration change signal to the notification setup data;

means for generating notification signal representative of the requested configuration change for the associated document processing device when the configuration change signal is indicative of a change for which notification is desired in accordance with an output of the comparing means;

identifier data storage means for storing identifier data representative of contact information for the least one supervisor; and means for directing data representative of the notification signal to the at least one supervisor after receipt of a configuration change signal.

2. The system for monitoring configuration changes of claim 1 further comprising:

means for receiving user data representative of an identity of a user requesting a configuration change; and means for communicating the user data to the at least one supervisor after receipt of a configuration change signal.

3. The system for monitoring configuration changes of claim 2 further comprising authentication means for verifying the identity of the user requesting a change configuration and that the user is authorized to request the configuration change.

4. The system for monitoring configuration changes of claim 3 wherein, upon the verification of the identity of the user and that the user is authorized to request the configuration change, the configuration of the document processing device is altered according to the configuration change request.

5. The system for monitoring configuration changes of claim 4 wherein in the event that at least one of the identity of the user requesting the configuration change is not verified and the user is not authorized to request the configuration change, the configuration of the document processing device is not altered.

6. The system for monitoring configuration changes of claim 1 further comprising means for directing the data representative of the notification signal to the at least one supervisor via at least one of a an SMTP message and a TCP message.

7. The system for monitoring configuration changes of claim 6 wherein the identifier data includes at least one of an electronic mail address and an IP address.

8. The system for monitoring configuration changes of claim 1 further comprising means for selecting which configuration change requests a notification signal will be generated.

9. The system for monitoring configuration changes of claim 1 further comprising means for selecting the parameters of the notification signal.

10. A method for monitoring configuration changes in a document processing device comprising the steps of:

receiving notification setup data representative of configuration changes for which notification is desired from an associated supervisor;

receiving a configuration change signal representative of a requested configuration change for an associated document processing device;

comparing the received configuration change signal to the notification setup data;

generating notification signal representative of the requested configuration change for the associated document processing device when the configuration change signal is indicative of a change for which notification is desired in accordance with an output of the comparison;

storing identifier data representative of contact information for the at least one supervisor in an associated data storage means; and directing data representative of the notification signal to the at least one supervisor after receipt of a configuration change signal.

11. The method for monitoring configuration changes of claim 10 further comprising:

receiving user data representative of an identity of a user requesting a configure change; and communicating the user data to the at least one supervisor after receipt of a configuration change signal.

12. The method for monitoring configuration changes of claim 11 further comprising the step of verifying the identity of the user requesting a change configuration and that the user is authorized to request the configuration change.

13. The method for monitoring configuration changes of claim 12 wherein, upon the verification of the identity of the user and that the user is authorized to request the configuration change, altering the configuration of the document processing device according to the configuration change request.

14. The method for monitoring configuration changes of claim 12 wherein in the event that at least one of the identity of the user requesting the configuration change is not verified and the user is not authorized to request the configuration change, the configuration of the document processing device is not altered.

15. The method for monitoring configuration changes of claim 10 further comprising the step of directing the data representative of the notification signal to the at least one supervisor via at least one of a an SMTP message and a rep message.

16. The method for monitoring configuration changes of claim 15 wherein the identifier data includes at least one of an electronic mail address and an IP address.

17. The method for monitoring configuration changes of claim 10 further comprising the step of selecting which configuration change requests a notification signal will be generated.

18. The method for monitoring configuration changes of claim 10 further comprising the step of selecting the parameters of the notification signal.

* * * * *

UNITED STATES PATENT AND TRADEMARK OFFICE
CERTIFICATE OF CORRECTION

PATENT NO.           : 7,676,668 B2                                       Page 1 of 1
APPLICATION NO.  : 11/778775
DATED                    : March 9, 2010
INVENTOR(S)          : Michael Yeung et al.

It is certified that error appears in the above-identified patent and that said Letters Patent is hereby corrected as shown below:

In claim 15, Column 6, starting at line 41, please replace the claim as follows:

--15. The method for monitoring configuration changes of claim 10 further comprising the step of directing the data representative of the notification signal to the at least one supervisor via at least one of a an SMTP message and a TCP message.--

Signed and Sealed this

Thirteenth Day of April, 2010

David J. Kappos
*Director of the United States Patent and Trademark Office*